United States Patent
Yoo et al.

(10) Patent No.: US 8,725,520 B2
(45) Date of Patent: May 13, 2014

(54) POWER EFFICIENT BATCH-FRAME AUDIO DECODING APPARATUS, SYSTEM AND METHOD

(75) Inventors: Heejong Yoo, San Diego, CA (US); Nidish Ramachandra Kamath, San Diego, CA (US); Eddie L. T. Choy, Carlsbad, CA (US); Johnny K John, San Diego, CA (US); Samir Kumar Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1258 days.

(21) Appl. No.: 12/204,593

(22) Filed: Sep. 4, 2008

(65) Prior Publication Data

US 2009/0070119 A1 Mar. 12, 2009

Related U.S. Application Data

(60) Provisional application No. 60/970,836, filed on Sep. 7, 2007, provisional application No. 61/086,251, filed on Aug. 5, 2008.

(51) Int. Cl.
*G10L 19/00* (2013.01)
*G06F 17/00* (2006.01)

(52) U.S. Cl.
USPC .................................. 704/500; 700/94

(58) Field of Classification Search
None
See application file for complete search history.

(56) References Cited

U.S. PATENT DOCUMENTS

| | | | |
|---|---|---|---|
| 6,332,175 B1 | 12/2001 | Birrell et al. | |
| 6,356,595 B1 * | 3/2002 | Czaja et al. | 375/262 |
| 7,111,179 B1 * | 9/2006 | Girson et al. | 713/300 |
| 7,921,309 B1 * | 4/2011 | Isbister et al. | 713/300 |
| 2001/0016784 A1 * | 8/2001 | Matsubara | 700/94 |
| 2001/0048647 A1 | 12/2001 | Abe et al. | |
| 2002/0103977 A1 | 8/2002 | Ewoldt | |

(Continued)

FOREIGN PATENT DOCUMENTS

| | | |
|---|---|---|
| CN | 1430124 A | 7/2003 |
| CN | 1977233 A | 6/2007 |

(Continued)

OTHER PUBLICATIONS

International Search Report & Written Opinion—PCT/US2008/075578, International Search Authority—European Patent Office—Apr. 9, 2009.

(Continued)

*Primary Examiner* — Angela A Armstrong
(74) *Attorney, Agent, or Firm* — Espartaco Diaz Hidalgo

(57) ABSTRACT

Power savings in a mobile device is accomplished by generating audio samples by decoding a bitstream with a decoding system within the mobile device. The generated audio samples are transferred into at least one memory bank in a set of memory banks in a power saver block within the mobile device. Parts of the decoding system not involved in the storing of the generated audio samples are switched off after batch decoding a bitstream associated with multiple audio frames. The bitstream includes bits less than that found in one audio file. At least one of the memory banks in the set of memory banks is power collapsible. The fetching of the decoded by the decoding system can be synchronized with a paging channel of a modem in the mobile device. The transferred audio samples is a lossless compression and may occur after a re-encoding.

44 Claims, 11 Drawing Sheets

(56) References Cited

U.S. PATENT DOCUMENTS

| | | | |
|---|---|---|---|
| 2004/0196724 A1* | 10/2004 | Chen et al. | 365/230.05 |
| 2005/0002253 A1 | 1/2005 | Shi et al. | |
| 2006/0262610 A1* | 11/2006 | Khellah et al. | 365/189.09 |
| 2007/0130383 A1 | 6/2007 | Dahan et al. | |
| 2007/0286288 A1* | 12/2007 | Smith et al. | 375/240.24 |
| 2009/0060093 A1* | 3/2009 | Narahari et al. | 375/340 |

FOREIGN PATENT DOCUMENTS

| | | |
|---|---|---|
| EP | 1 028 425 A2 * | 8/2000 |
| EP | 1028425 | 8/2000 |
| EP | 1221645 | 7/2002 |
| EP | 1 785 811 A1 * | 5/2007 |
| EP | 1785811 | 5/2007 |
| JP | 61210599 A | 9/1986 |
| JP | 2001273718 A | 10/2001 |
| JP | 2003208236 | 7/2003 |
| KR | 20000058017 A | 9/2000 |
| TW | 200509065 | 3/2005 |
| TW | 200606352 | 2/2006 |
| WO | WO0155834 | 8/2001 |
| WO | 2006003539 A1 | 1/2006 |

OTHER PUBLICATIONS

Taiwan Search Report—TW097134237—Tipo—Apr. 9, 2012.

* cited by examiner

POWER EFFICIENT BATCH-FRAME AUDIO DECODING APPARATUS, SYSTEM AND METHOD

RELATED APPLICATIONS

This application is related to and claims priority from (1) U.S. Provisional Patent Application Ser. No. 60/970,836, filed Sep. 7, 2007, for BATCH AUDIO DECODING SCHEME FOR POWER-EFFICIENT AUDIO DECODING SYSTEM; and (2) U.S. Provisional Patent Application Ser. No. 61/086,251, filed Aug. 5, 2008, for BATCH AUDIO DECODING SCHEME FOR POWER-EFFICIENT AUDIO DECODING SYSTEM.

TECHNICAL FIELD

The present disclosure relates generally to audio processing. More specifically, the present disclosure relates power efficient batch decoding.

BACKGROUND

Portable devices such as personal digital assistants (PDAs), pocket PCs, iPhone, or smartphone have gained lots of popularity recently. With the development of VLSI technology, these types of mobile devices have become more light weight and have equipped with higher computing capability which in turn makes the multimedia applications such as video, audio, and game very popular. Audio playback on mobile devices, especially, has been even more successful as it was proven for the case of iPod. Audio playback may involve audio processing.

The term audio processing refers to the processing of audio signals. Audio signals are electrical signals that represent audio, i.e., sounds that are within the range of human hearing. Audio signals may be either digital or analog. Many different types of computing devices may utilize audio processing techniques. Examples of such computing devices include desktop computers, laptop computers, workstations, wireless communication devices, wireless mobile devices, personal digital assistants (PDAs), smartphones, iPods, MP3 players, handheld gaming units or other media players, and a wide variety of other devices, some of which were mentioned above.

One of the functions of audio processing is to perform audio compression or decompression, i.e., represent the audio signal with compressed data to reduce the size of audio files or restore original files out of the compressed data. There are many different audio coding (compression/decompression) algorithms that are in use today. Some examples of audio coding algorithms include MPEG-1 Audio Layer 3 (MP3), Advanced Audio Coding (AAC), High Efficiency AAC (HE-AAC), HE-AAC version 2 (HE-AAC v2), Windows Media Audio (WMA), WMA Pro, etc.

The audio file may have different formats depending on the audio coding algorithms used to compress the audio signals. The compressed data may sometimes be referred to as a bitstream. The bitstream (i.e., the compressed audio file, or parts of the compressed audio file) may be stored in a memory. Sometimes the bitstream is encrypted or stored in a format associated with an operating system of the computer or mobile device. To decompress the bitstream and to decrypt the bitstream (if it is encrypted) requires many computations per second.

The processor (sometimes called an application processor) which runs the application software may interact with a specialized processor. One type of specialized processor is known as a digital signal processor (DSP). The application processor may retrieve the bitstream from memory and pass it to the DSP to decrypt and/or decompress the bitstream. The application processor may also decrypt and/or decompress the bitstream. Decompressing the bitstream consumes power. Finding a technique to process the bitstream at a lower power is desired. Such a technique will help reduce the battery consumption of the audio decoding for mobile devices.

SUMMARY

The techniques disclosed herein relate to power efficient batch decoding of audio frames. According to an aspect of the approach disclosed herein, a method of saving power includes generating audio samples by decoding a bitstream with a decoding system, transferring audio samples into at least one memory bank in a set of memory banks in a power saver block, and switching off power to parts of the decoding system not involved in storing the audio samples, after batch decoding is finished.

According to another aspect of the approach, a device includes a memory storing at least one bitstream, a processor coupled to the memory for batch decoding at least one bitstream generating PCM samples, and a power saver block which stores the PCM samples after a transfer of the PCM samples from the processor.

According to another aspect of the approach, a mobile device capable of audio playback includes means for generating PCM samples by decoding a bitstream with a decoding system, means for transferring the PCM samples into at least one memory bank in a power saver block, and means for switching off power to parts of the decoding system not involved in storing the PCM samples, after batch decoding is finished.

According to another aspect of the approach, a computer-readable medium configured to store a set of instructions includes computer-readable program code means for generating PCM samples by decoding a bitstream with a decoding system, computer-readable program code means for transferring the PCM samples into at least one memory bank in a power saver block, and computer-readable program code means for switching off power to parts of the decoding system not involved in storing the PCM samples, after batch decoding is finished.

According to another aspect of the approach, a computer-readable medium embodying a set of instructions executable by one or more processors includes code for providing a frequency transform of the signal, code for applying an FDLP scheme to the frequency transform to generate a carrier, code for determining a temporal masking threshold, and code for quantizing the carrier based on the temporal masking threshold.

BRIEF DESCRIPTION OF THE DRAWINGS

It is to be understood that the drawings are solely for purpose of illustration. Furthermore, the components in the figures are not necessarily to scale, emphasis instead being placed upon illustrating the principles of the disclosed batch decoding technique. In the figures, like reference numerals designate corresponding parts throughout the different views.

Figure 8:
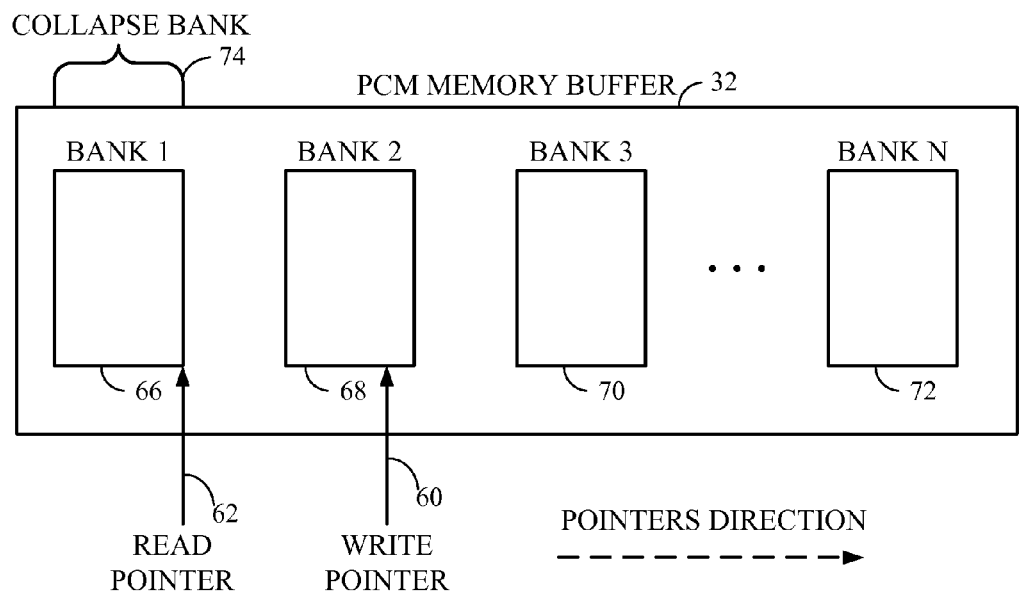
Figure 9:
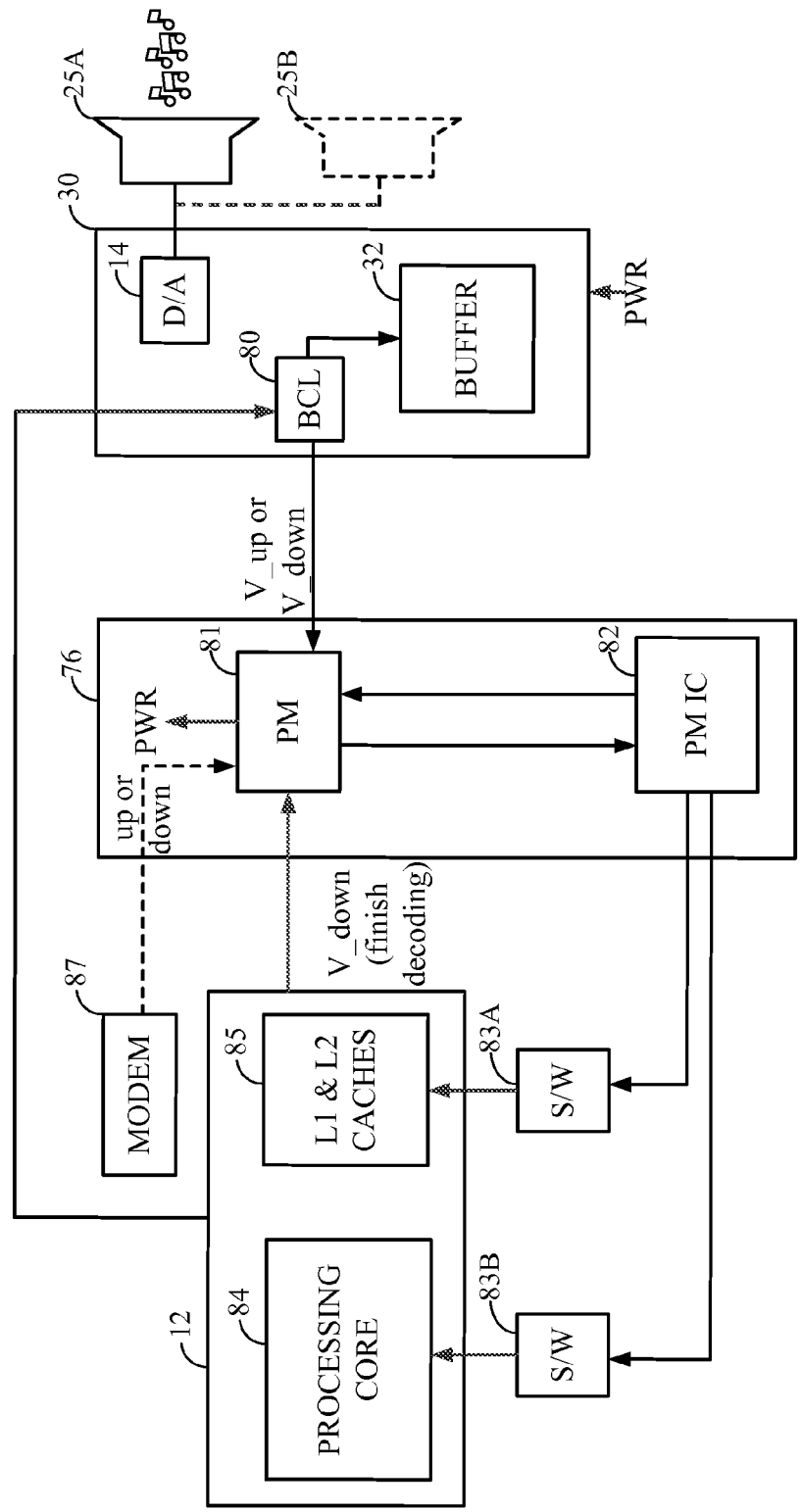
Figure 10:
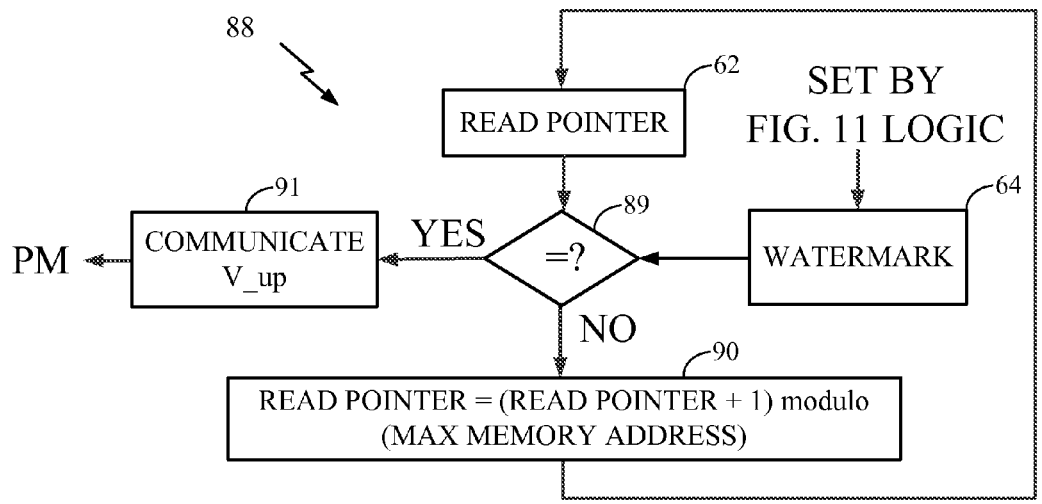
Figure 11:
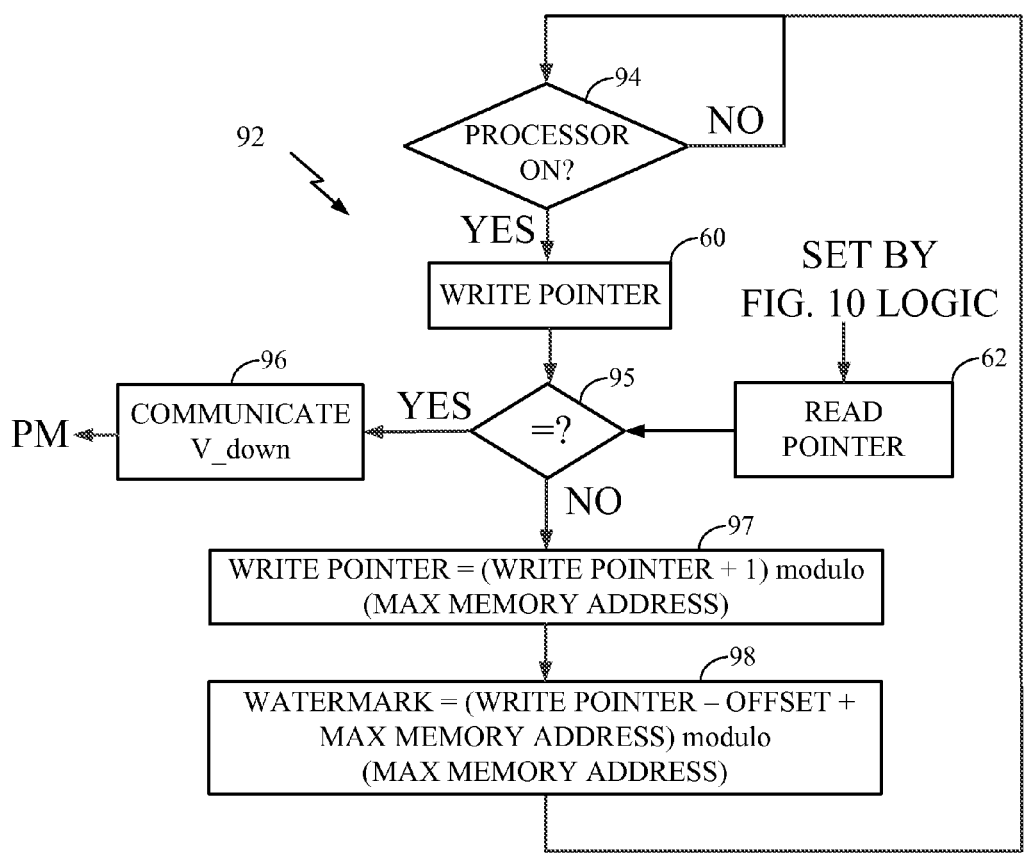
Figure 12:
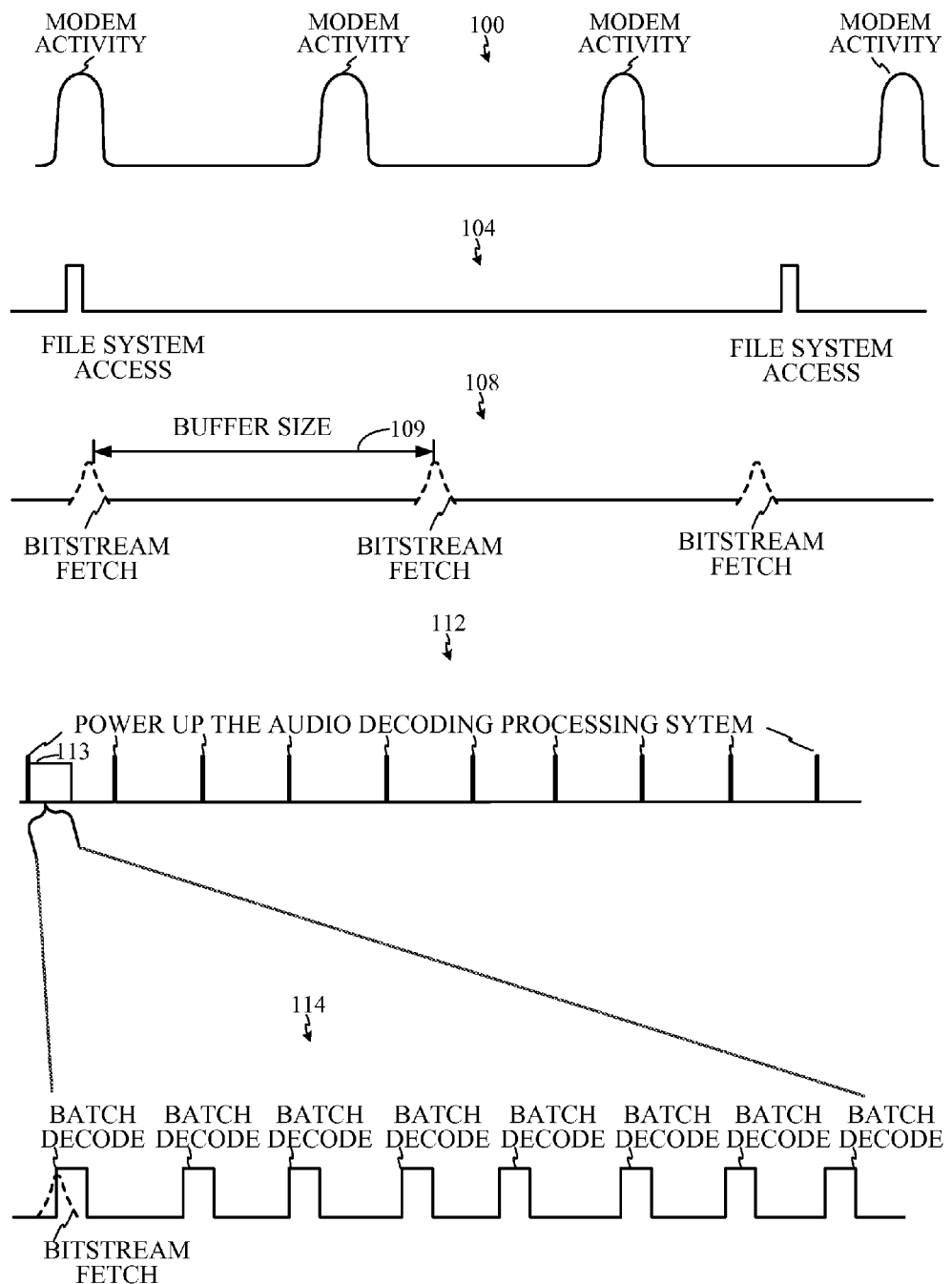
Figure 13:
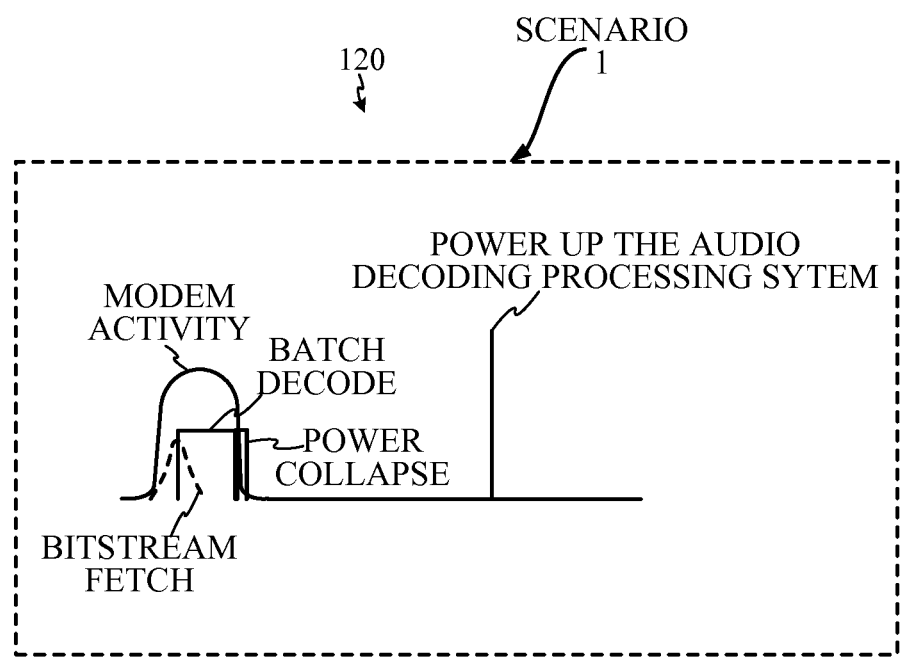
Figure 14A:
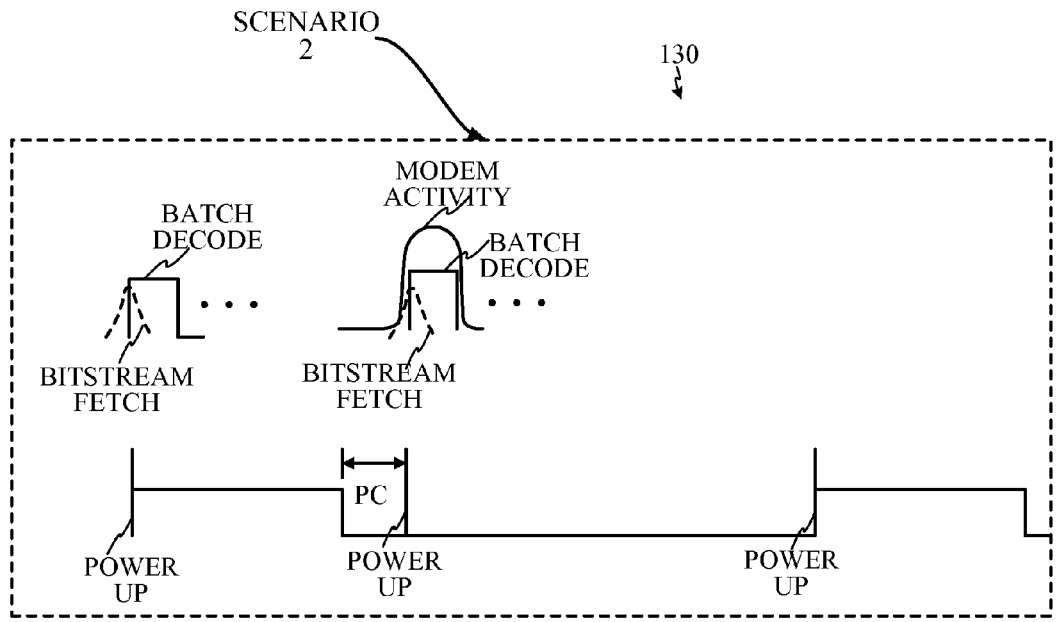
Figure 14B:
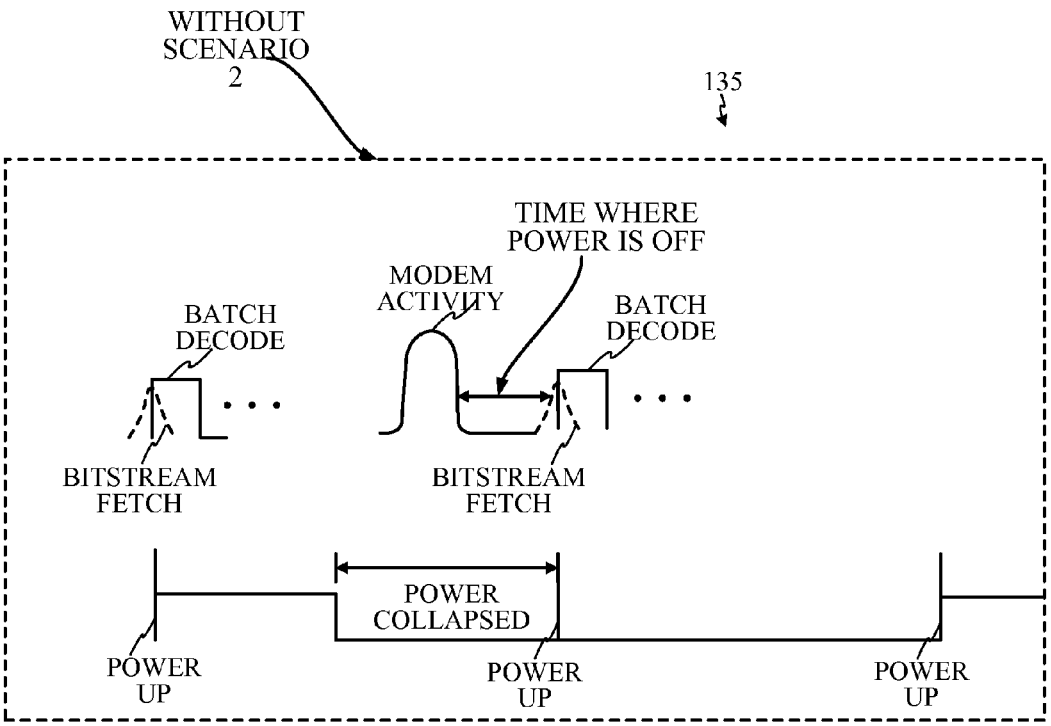
Figure 15:
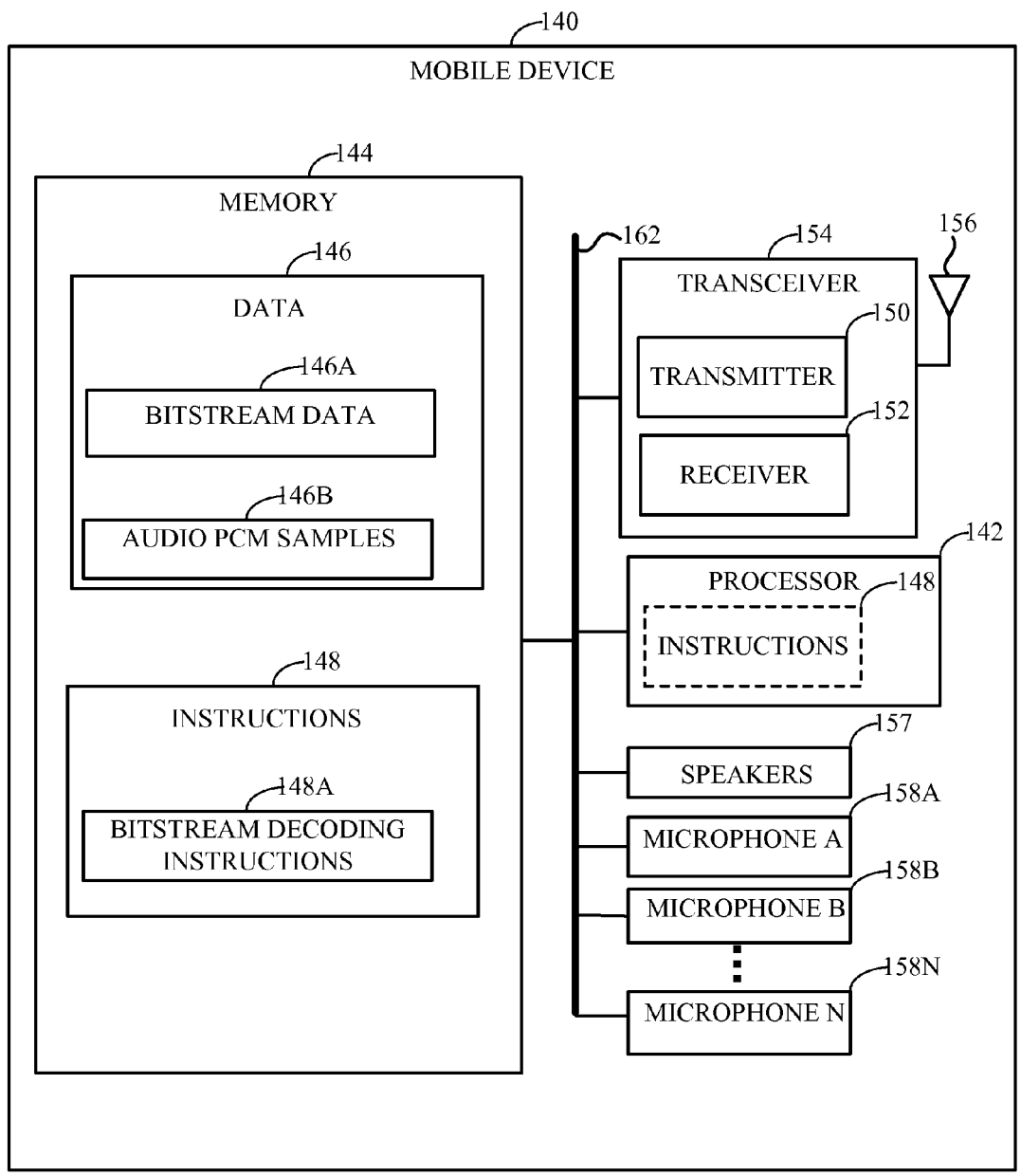

The PCM memory buffer shown in FIG. 8 comprises multiple banks of memory each of which can be independently powered up or down;

FIG. 9 shows more details of hardware/software blocks used in the batch-frame decoding scheme;

FIG. 10 illustrates a flowchart for the logic control of the read pointer reading from the PCM buffer memory;

FIG. 11 illustrates a flowchart for the logic control of the watermark and write pointer writing into the PCM buffer memory;

FIG. 12 illustrates exemplary timing diagrams of modem activity, file system access, bitstream fetching, powering up of the audio decoding processing system, and batch decoding;

FIG. 13 is an illustration of when the modem activity, bitstream fetch and batch decode are synchronized;

FIG. 14A illustrates how the powering up of the audio decoding processing system period may be adjusted;

FIG. 14B illustrates the operation of the decoding processing system without the configuration dependency of the either the bitstream fetch or modem activity, i.e., the power up of the audio decoding processing system period is not adjusted; and FIG. 15 is a block diagram illustrating various components that may be utilized in a mobile device.

DETAILED DESCRIPTION

Figure 1:
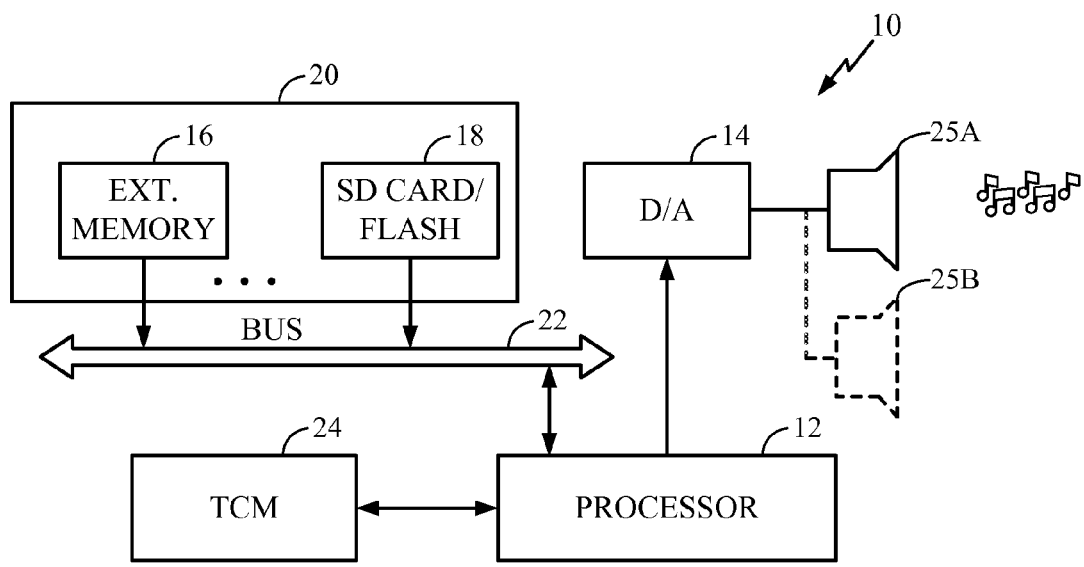
FIG. 1 shows block diagram of high-level architecture for conventional audio decoding system.

FIG. 1 shows block diagram of high-level architecture for a conventional audio decoding system 10. Processor 12 reads audio bitstream data from either external memory 16 or Secure Digital (SD) Card Flash (non-volatile) memory 18 which are typically located off-chip in an area known as external media 20. By accessing a file in the external media 20, the processor 12 may read the bitstream from a memory in the external media 20 or the bitstream may be fetched from internal memory (not shown) via BUS 22 into a tightly coupled memory (TCM) 24 of processor 12. A file system may be present in either the internal memory or external media 20, or both. For exemplary purposes in this disclosure, at times, it is assumed that the file system access is from external media 20 and the bitstream fetch is from internal media (not shown). In the conventional audio system 10, the processor 12 decodes the bitstream and writes PCM samples into the TCM 24 of the processor 12. However, the TCM 24 memory typically does not hold many decoded audio frames because of memory size limitations. Typically, a file system access from external media 20 may read the bitstream into internal memory, and then one ore more bitstream fetches from the internal memory into the TCM 24 of the processor 12. This may be desirable if there is a long latency in retrieving data from external media 20. In another embodiment, where there is enough memory available in the TCM 24 of the processor 24, the file system access and the bitstream fetch are exactly the same. The distinction between file system access and bitstream fetch is intended to be interpreted with the broadest scope possible. As such, at times, different intervals or periods may be shown between file system access and bitstream fetch. However, in several embodiments there is no distinction between file system access and bitstream fetch, they are exactly the same. Depending on the system requirements a mobile device may have an application processor decompressing the bitstream or a specialized (DSP) processor decompressing the bitstream. For the purposes of this disclosure it is understood to a person having ordinary skill in the art that processor 12 may either be an application processor or a specialized (DSP) processor.

Audio frames may be a constant size but typically are in the range of 10 ms to 20 ms. In FIG. 1, after reading the bitstream, the processor 12 decodes each frame of bitstream producing decoded pulse coded modulation (PCM) samples to transfer from the TCM 24 to digital-to-analog (D/A) conversion block 14 by either a sample based (continuous delivery) or a frame based (queued delivery) data transfer, up-sampling and noise shaping operation may be executed to minimize the quantization noises during D/A conversion process.

Figure 2:
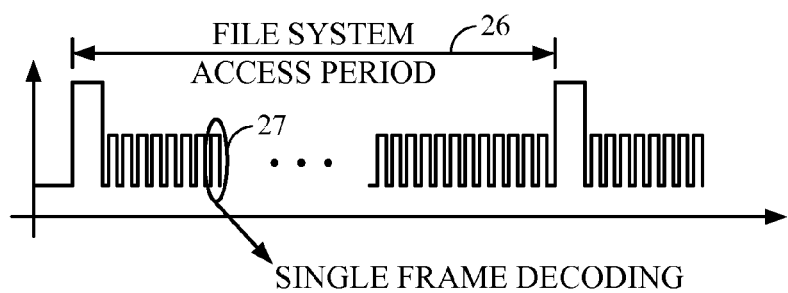
FIG. 2 is a timing chart illustrating the decoding of a many single frame bitstreams.

FIG. 2 is a timing chart illustrating the decoding of many single frame bitstreams. A bitstream may represent a lossy compression, a lossless compression, for example run-length coding, or the like. The file system access period 26 is the interval the processor 12 transfers the bitstream data of many frames into TCM 24 of the processor 12. The file system access period 26 is limited by the predefined bitstream buffer size. The processor 12 decodes one frame 27 of bitstream and idles sometimes, before it starts the decoding of next frame of bitstream. The time interval between decoding of consecutive frames by the processor 12, T, is defined as $$T = \frac{PCMSamples_{per\,frame}}{Fs},$$

where Fs is the sampling frequency of the decoded PCM samples and PCM Samples$_{per\,frame}$ is the number of PCM samples generated out of one frame decoding for each audio codec format.

As an example, suppose an AAC type audio frame is being decoded, and the Fs is 44,100 Hz. The processor 12 decodes a single frame of AAC bitstream periodically every T=1024/44100=23 msec, where PCM Samples$_{per\,frame}$ for AAC is 1024. During this 23 msec interval, typically the processor 12 is active for decoding during a small fraction of time and only the D/A conversion block 14 and the TCM 24 storing one frame PCM samples need to be active during entire 23 msec for the audio playback. The rest parts of audio decoding system including the processor 12, once decoding is finished, can be switched into a power-efficient collapse or (deep) sleep mode to save the power consumption of the decoding system.

One drawback of this approach, however, is the overhead related to the power collapses and power wake-ups. For instance, when the processor 12 switches its status in and out of the power collapse mode, or sleep mode, it may need to save or load all the status of the variables, which is oftentimes referred to as "context switch." The timing and power overhead related with context switch may become significant, overshadowing the benefits that can be achieved from power collapse if context switching happens too often. For this reason, often it is decided to not power collapse the processor 12 when the PCM samples are being sent to D/A conversion block 14 from the TCM 24. To minimize the power overhead related above, a longer period of power collapsing is enabled by a batch decoding scheme disclosed herein.

Figure 3A:
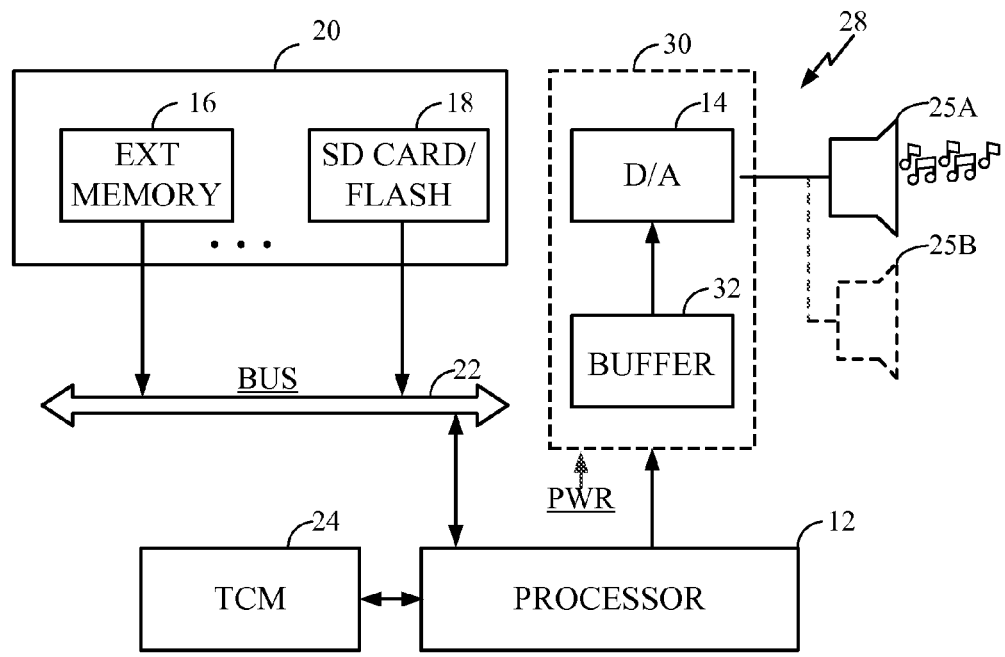
FIG. 3A illustrates a block diagram of high-level architecture for a power-efficient batch-frame decoding system.

FIG. 3A illustrates a block diagram of high-level architecture for a power-efficient audio decoding system 28. The two blocks inside the power saver block 30 are active during the audio playback. By adding a the PCM buffer 32 into the power saver block 30, PCM samples from the TCM 24 may be transferred into the PCM buffer 32. The audio (PCM) may be grouped before the group is sent (e.g., written) from the processor 12 to the power saver block 30. In a different embodiment, the processor 12 may decode the bitstream and directly write PCM samples into the PCM buffer 32. For a certain number of continuous frames of audio bitstream, the audio decoding system except the PCM memory buffer 32 and the D/A conversion block 14 inside the power saver block 30 can stay active for a longer period of time in power-efficient collapse or sleep mode. Thus, the addition of the PCM memory buffer 32 helps reducing the number of power collapses and wake-up, because the bitstreams associated with multiple frames may be batch-decoded. The PCM memory buffer 32 may comprise multiple memory banks that may be independently controlled for power collapse so any bank can be turned off, one after the other as the decoded PCM samples are being converted from digital to analog by the D/A conversion block 14. Each memory bank is capable of being power collapsed, and as such each is a power collapsible memory bank. By adding the PCM buffer 32 power may be switched off to parts of the decoding system not involved in storing the audio samples, after batch decoding is finished. It should be noted that the number of bits of the bitstream being batch decoded may be less than one audio file length. For very small file sizes containing relatively few number of frames, it may be possible to batch-decode the entire file.

Figure 3B:
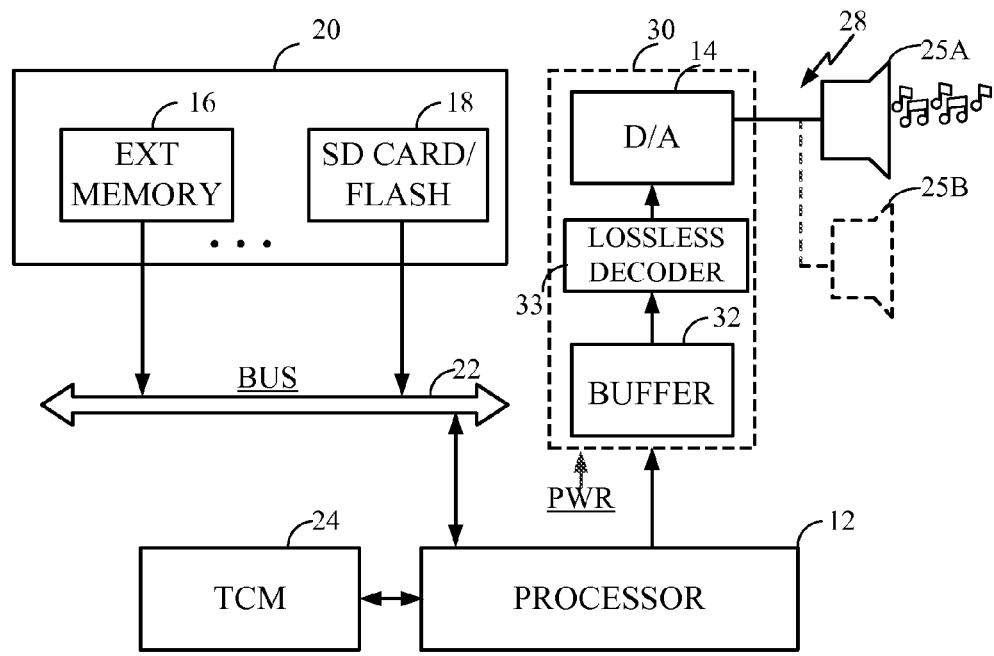
FIG. 3B illustrates a different embodiment of a power-efficient batch-frame decoding system in which lossless decoding block is part of the power saver block.

FIG. 3B illustrates an example of different embodiment of FIG. 3A for the system with the limited physical size of PCM memory buffer 32. The system shown in FIG. 3A can be used with more frequent batch decoding activity by adding a lossless decoder block 33 in the power saver 30 in between D/A conversion block 14 and PCM memory buffer 32. It is, however, known to a person having ordinary skill in the art that more frequent batch decoding may result in less power savings. FIG. 3B illustrates an exemplary embodiment for the case where physical size of PCM memory buffer 32 may be limited, but it is not desired to decrease the interval between batch decoding events. Once the processor 12 finishes the decoding of a bitstream, the processor 12 can re-encode the decoded PCM samples (accessed from either the TCM 24 or the PCM buffer 32). Thus, a different bitstream for the audio frame (or frames) is generated by the re-encoding of the decoded PCM samples. The different bitstream may then be written directly into the PCM buffer 32 and the lossless decoder 33 may directly provide them to the D/A conversion block 14. Alternatively, after decoding of the different bitstream, the newly generated PCM samples may be written to the TCM 24, before transferring them to the external media 20. Lossless coding in general provides less compression than the typical lossy coding but it can typically save up to 30-40% of data size without introducing any distortion due to its lossless characteristic. As explained above, the data stored in the PCM memory buffer 32 in FIG. 3B may be lossless encoded data (i.e., a different bitstream) which may be decoded by the lossless decoder block 33 before it is played through D/A conversion block 14. The advantage of having the lossless decoder block 33 in the power saver block is that it allows for the ability to playback PCM samples which are not highly distorted.

Figure 4:
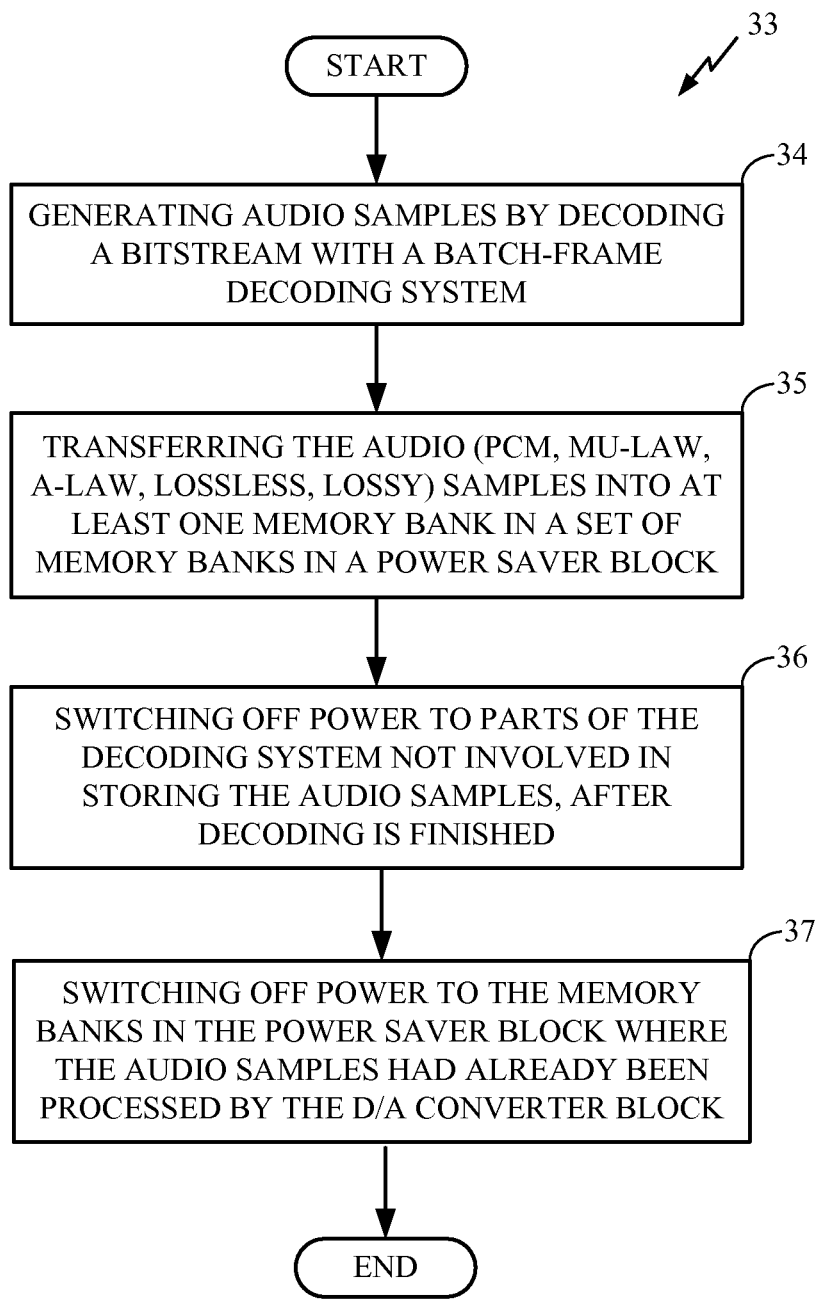
FIG. 4 illustrates a flowchart of the high-level architecture of the power efficient batch-frame decoding system.

FIG. 4 illustrates a flowchart 33 of the high-level architecture of the power efficient batch-frame decoding system. Audio samples are generated by decoding a bitstream with a batch-frame decoding system 34. The batch-frame decoding system which includes a processor transfers the audio (may be PCM, mu-law, A-law) samples into at least one memory bank of a set of memory banks in a power saver block 35. Power is switched off 36 to parts of the batch-frame decoding system not involved in storing the PCM samples after bitstream decoding is finished. Power may further be switched off 37 to the memory banks in the power saver block where the audio samples have already been processed by the D/A conversion block 14.

Figure 5:
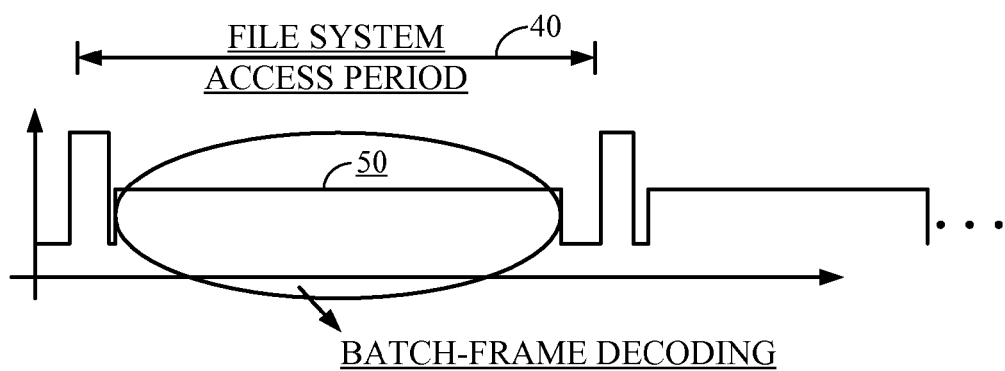
FIG. 5 shows an example of a batch-frame decoding timing chart when the PCM memory buffer 32 size is relatively large.

FIG. 5 shows an example of a batch-frame decoding timing chart when the PCM memory buffer 32 size is relatively large. File system access period 40 in FIG. 5 denotes an interval of time when audio bitstream data is transferred from either external media 20 or internal memory location into TCM 24 buffer through the BUS 22. The BUS 22 represents at least one bus. The file system access period 40 is limited by the assigned bitstream buffer quota in the TCM 24. For example, if the bitrate of original bitstream is 128 kbps and the maximum bitstream to be transferred is 32 Kbytes, a total of a two second playback time bitstream data can be maximally transferred into TCM either by a single transfer or by multiple transfers depending on the maximum bandwidth of BUS 22.

The maximum size (in bytes), L, of a PCM block size for t seconds of playback can be obtained from following equation:

$$L(t, Fs, ch, \text{bit\_precision})[\text{bytes}] = \frac{Fs \times t \times ch \times \text{bit\_precision}}{8},$$

where t is the playback time,
Fs is the sampling frequency,
ch is the number of channels, and
bit_precision is the number of bits to represent each PCM sample.

For instance, for a PCM block size with a two second playback time with 48000 Hz sampling frequency, stereo channel, and 16-bit data precision should be $$L(2, 48000, 2, 16)[\text{bytes}] = \frac{48000 \times 2 \times 2 \times 16}{8} = 384000 \, [\text{bytes}].$$

When the PCM memory buffer 32 is bigger than 384000 bytes in this example, the audio decoder can batch-frame decode the bitstream data continuously for the two second playback time. Thus, the larger PCM memory buffer 32 size does not constrain the batch-frame audio decoding period 50. The decoding system except the power saver block 30 can go into the power-efficient collapse or sleep mode. Once the system goes into the low-power mode, it may only need to wake up when all or most of the decoded PCM samples are consumed.

The batch-frame decoding scheme illustrated in the present disclosure shows a reduction of power collapse/wake up cycles compared to the conventional decoding scheme. Another aspect of the batch-frame decoding scheme illustrated here is that both file access operation and audio decoding operation can be performed in tandem while the audio decoding system is fully powered up, and therefore can reduce one more power collapse/wake up cycle.

In addition to the reduction of the processor 12 overhead associated with power collapse/wake up operation, a longer baseline (batch-frame audio decoding) period results due to the batch-frame decoding scheme. This allows for the possibility of more power shutdown of the hardware blocks besides the power saver blocks.

Figure 6:
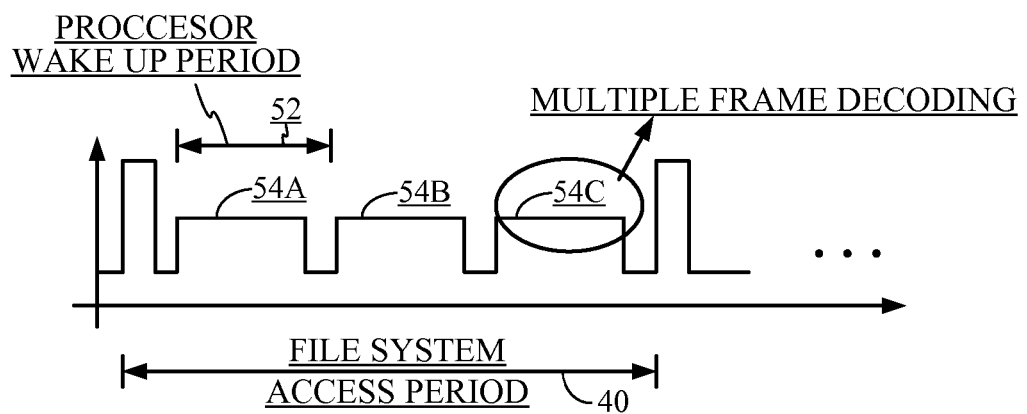
FIG. 6 shows an example of a batch-frame decoding timing chart when PCM memory buffer 32 size is relatively small.

FIG. 6 shows the example of a batch-frame decoding timing chart when PCM memory buffer size 32 is relatively small. In this case, the batch-frame audio decoding period 50 from FIG. 5 is represented by three exemplary batch-frame audio decoding periods 54A, 54B, 54C. In this embodiment, each of these (54A, 54B, 54C) exemplary batch-frame audio decoding periods are constrained by the physical size of the PCM memory buffer 32. During each exemplary batch-frame audio coding period multiple frames may be decoded. In this embodiment, the PCM memory buffer 32 is not able to hold all of the PCM samples that were generated in the example being described in FIG. 5 which had the larger PCM memory buffer 32. As a consequence, the processor 12, wakes up (see processor wake up period 52) out of power collapse or sleep mode a few times in between the file system access period 40. Whereas, the processor 12 as a result of the embodiment being illustrated in FIG. 5 did not wake up a few times in between the file system access period 40, because of larger PCM memory buffer 42 and thus, the longer batch-frame audio decoding period 50. Therefore, the power savings due to the limited number of power collapse/wake up cycle may be smaller when the PCM memory buffer 32 is smaller as compared when the PCM memory buffer 32 is large. Also illustrated in FIG. 6 is the processor wake period 52.

Figure 7:
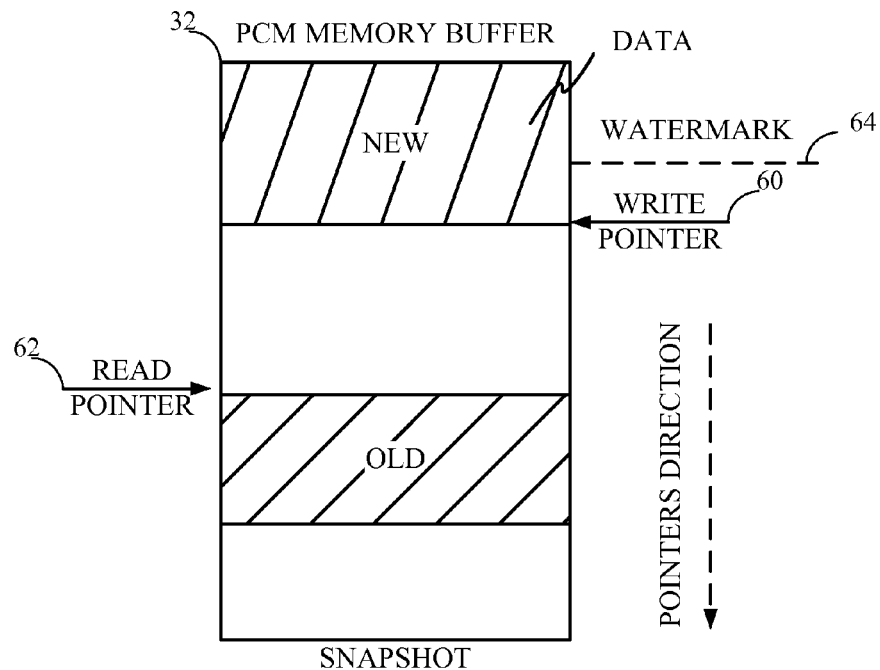
FIG. 7 shows a snapshot of the PCM memory buffer with a write pointer and read pointer pointing at two different memory locations in the PCM memory buffer.

FIG. 7 shows a snapshot of the PCM memory buffer 32 with a write pointer 60 and read pointer 62 pointing at two different memory locations in the PCM memory buffer 32. The position of the latest data written is recorded by an address register, called the write pointer 60. The position of the last data read out from the PCM memory buffer 32 by the buffer control logic (BCL) 80 (see FIG. 9) is recorded by an address register called the read pointer 62. Both the read pointer 62 and write pointer 60 continually advance in the same direction and when their value is equal to the end address of the PCM memory buffer 32, they wrap around and reset to a value equal to the start address of the PCM memory buffer 32, this is known as circular addressing. In FIG. 7, the top of PCM memory buffer 32 contains "new" data as the write pointer 60 has just passed the top memory locations. The read pointer 62 is reading "old" audio data. When the read pointer 62 reaches the watermark 64, it triggers the processor 12 to resume decoding audio frames. The decoded PCM samples will be written to PCM memory buffer 32 resulting in the increase of the write pointer 60 and therefore the watermark 64 will increase as well.

To achieve on the order of seconds worth of power collapse or sleep mode without wake up interrupt, a relatively large PCM memory buffer 32 may be needed. An array of smaller memory banks rather than a large single PCM memory buffer 32 can be used for the physical PCM memory hardware. Each smaller memory bank may independently be controlled for power collapse so any memory bank can be turned off one after the other as the decoded PCM samples are being converted from digital to analog by the D/A conversion block 14.

The PCM memory buffer 32 shown in FIG. 8 comprises multiple banks of memory, 66, 68, 70 and 72, each of which can be independently powered up or down. The BCL 80 (shown in FIG. 9) may provide ways to power up or down the independent memory blocks. In FIG. 8 after the read pointer 62 has reached the end of the memory bank shown on the left of the figure, the memory bank 66 is power collapsed 74, i.e., power is no longer provided to that bank of memory. By having multiple banks of memory, audio samples may be transferred (e.g., from the TCM 24) into at least one memory bank in a set of memory banks in the power saver block 30. Power may be shut off to a memory bank after all the PCM samples in the memory bank has been accessed. The accessed samples are played out of at least one speaker. In an alternate embodiment, the accessed samples may be read into a file.

The PCM memory buffer 32 in FIG. 8, during its normal mode of operation, initially contains all the data provided by the processing core 84, and has all the banks of memory powered on. Given the sequence of increments for the read and write pointers, there are two sets of possible address locations which contain invalid data. The first set is when the read pointer 62 is numerically greater in value than the write pointer 60, this set of addresses or buffer locations consists of those whose values are less than the read pointer 62, but whose values are greater than write pointer 60. The second set is when the read pointer 62 is numerically lesser in value than the write pointer 60, this set of addresses or buffer locations consists of those whose values are less than the read pointer 62 or whose values are greater than write pointer 60. Depending on the positions of the read pointer 62 and write pointer 60 relative to each other, the appropriate set above is identified, and the corresponding banks of memory are powered down.

FIG. 9 shows more details of hardware/software blocks used in the batch-frame decoding scheme. The processor 12 decodes the bitstreams from multiple audio frames and writes the output PCM samples in the PCM memory buffer 32. After this step is complete, the processor 12 programs the power manager (PM) 81 in the power management block 76 of FIG. 9. This act of programming the PM 81 turns off the power to the processor 12. When a certain amount of PCM samples have been transferred from the PCM memory buffer 42 to the D/A conversion block 14 of FIG. 9, the BCL 80 initiates the programming of the PM 81 based on the watermark. The PM 81 operates by a voting process. If the majority of the votes are "up" the processor 12 is turned on via the power management integrated circuit (PMIC) 82. If the votes are "down" the processor 12 is turned off via the PMIC 82. During the periods when the decoding of the bitstream by the processor 12 generates the PCM samples, the PM 81 votes that the power to the processor 12 be up. The PMIC provides voltage to the processor 12. After the processor 12 has been powered up, the processor 12 resumes the decoding of the bitstreams corresponding to the subsequent audio frames. This sequence repeats until the audio content has been completely decoded and processed by the D/A conversion block 14 and played out the speaker(s), or the process has been stopped by user intervention.

The processor 12 is coupled to multiple power control foot-switches (marked as S/W) 83A, 83B. Inside processor 12 there is a processing core 84 coupled to an L1 and L2 cache memory 85. The L1 and L2 cache memories are optional. The processing core 84 can use a memory controller (not shown) to write and access data in external media 20 to transfer data to the processor 12. Alternatively, processing core 84 can read directly into the external media 20 and then transfer a bitstream to the processor 12. The decoding of the bitstream by processor 12 generates PCM samples which are stored in the PCM memory buffer 32. The data connection between PCM buffer 32 and the processor 12 is not shown in FIG. 9 for simplicity. The foot-switches 83A, 83B reduce leakage current which becomes dominant source of power consumption in the latest 65 nm or 45 nm semiconductor process.

A modem 87 may also be operating in the integrated circuit (or series of integrated circuits). The modem 87 usually has its own power control logic. However, when the modem 87 is active it can send a signal to the power manager 81. The signal can be an on/off status of the modem itself. The status can then be interpreted by the BCL 80 as a "vote" signal (up/down). As an example, if the modem 87 is on the vote can be up, and if the modem 87 is off the vote can be down. Thus, the modem 87 can be used to affect the power cycling (when the processor 12 wakes up and goes to sleep or power collapses) of the processor 12 involved in decoding the bitstream. Using the modem 87 to affect power cycling is an optional feature.

FIG. 10 illustrates a flowchart 88 for the logic control of the read pointer 62 reading from the PCM buffer memory 32. Such logic control may be performed by BCL 80 block. A watermark 64 is set by the processor 12 through the logic shown in FIG. 11 and may be continuously compared to the read pointer 62 by BCL 80. When the read pointer 62 equals (YES) the watermark 64 a signal (voltage up) communicates 91 to the PM 81. The voltage up signal indicates that the PM 81 should turn on the power to the processor 12 via the PMIC 82. The processor 12 begins normal audio bitstream decoding. If the read pointer 62 does not equal the watermark 64 the read pointer increments and is modulo compared to the max memory address of the bank (or whole memory if the memory is not an array of memory banks).

FIG. 11 illustrates a flowchart 92 for the logic control of the watermark 64 and write pointer 60 writing into the PCM buffer memory 42. Such logic control may be performed by BCL 80 block. The logic should check 94 if the processor is on. If the processor 12 is not on (NO) the check 94 another check 94 is performed until the processor 12 is on (YES). The write pointer 60 and read pointer 62 are compared 95, if the pointers are equal (YES) then a signal (voltage down) communicates 96 to the power manager (PM) 81. The voltage down signal indicates that the PM 81 should turn off the power to the processor 12 via the PMIC 82. The processor 12 then power collapses. If the write pointer 60 does not equal the read pointer 62, the write pointer 60 increments and is modulo compared to the max memory address 97 of the bank (or whole memory if the memory is not an array of memory banks). The next watermark 64 equals the write pointer 60 minus an offset plus the max memory address and is modulo compared to the max memory address 98 of the bank (or whole memory if the memory is not an array of memory banks). The offset is to account that there is some latency between the signal (vote up) is sent to the PM 81 and the processor 12 powers up. As illustrated in FIG. 10, the watermark is used in the comparison with the read pointer 62 to control when the processor wakes up.

FIG. 12 illustrates exemplary timing diagrams of the events: modem activity, file system access, bitstream fetching, powering up of the audio decoding processing system, and batch decoding. Although not necessarily illustrated in the diagrams these events may be synchronous with one another. The modem may operate in a slotted mode. The slotted mode puts the mobile device into a sleep mode whenever it has gone idle for more than some fixed amount of time. Slotted mode decreases the power consumption, since the mobile device wakes up to briefly monitor the paging channel during certain slots of time, i.e., the paging channel is slotted. There is a tradeoff between how long a mobile device is sleeping and when pages come in. The longer the sleep time, the greater the chance that a page will be missed. The modem activity illustrated in the first timing diagram 100 of FIG. 12 is an example of the modem operating in a slotted mode. Thus, the active time periods in the first timing diagram 100 illustrated may represent a paging channel when the modem is in slotted mode, referred to as a slotted paging channel or 'the paging channel is slotted'. The file system access illustrated in the second timing diagram 104 may be synchronous with the modem activity. The bitstream fetch, in the third timing diagram 108, may also be synchronous with the modem activity. In addition, the buffer size 109 in the TCM 24 may constrain how often there is a bitstream fetch. As noted above, the file system access and the bitstream fetch may be the same. In these cases, the illustration of FIG. 12 for the timing diagrams of the bitstream fetch and file system access would be the same. The fourth timing diagram 112 illustrates powering up of the audio decoding processing system, and this may also be synchronous with the modem activity. A batch-frame audio decoding period 113 similar to the one illustrated 50 in FIG. 5 is illustrated. Batch decoding may occur in a "burst." As mentioned previously, for the purposes of this disclosure it is understood to a person having ordinary skill in the art that processor 12 may either be an application processor or a specialized (DSP) processor. When processor 12 is an application processor, the bursts may occur periodically, for example at 420 ms. The processor 12 may wake up in between bursts (as illustrated in the fourth timing diagram 112). A person having ordinary skill in the art will also recognize that an application processor and DSP may work together to implement a batch decoding system (i.e., batch decode or burst batch decode). In each burst there may be many batch-decodes as illustrated in the fifth timing diagram 114, and produce PCM samples quicker than the PCM samples are played out. Hence, this burst batch-frame decoding is also known as faster than real time (FTRT) decoding. In FTRT batch decodes are grouped together to further increase the idle time for processor 12. Thus, the power consumption is reduced even further.

FIG. 13 is an illustration 120 of when the modem activity, bitstream fetch and batch decode are synchronized. Also illustrated is how the power collapse occurs just after the completion of a batch decode.

FIGS. 14A illustrates 130 how the powering up of the audio decoding processing system period may be adjusted. The audio decoding processing system may be configured such that when either a bitstream fetch or a modem activity event occurs the power up period may be adjusted. The adjustment is illustrated in FIG. 14A. FIG. 14B illustrates 135 the operation of the decoding processing system without the configuration dependency of the either the bitstream fetch or modem activity, i.e., the power up period is not adjusted. The audio decoding processing system may also operate such that file accesses adjust the power up period (not shown).

FIG. 15 is a block diagram illustrating various components that may be utilized in a mobile device 140. The mobile device 140 is an example of a device that may be used to implement the systems and methods described herein for power efficient batch-frame audio decoding.

The mobile device 140 includes a processor 142. The processor 142 may be a general purpose single- or multi-chip microprocessor (e.g., an ARM), a special purpose microprocessor, e.g., a DSP, a microcontroller, a programmable gate array, etc. The processor may be referred to as a central processing unit (CPU). Although just a single processor is shown in the mobile device 140 of FIG. 15, in an alternative configuration, a combination of processors 142 (e.g., an ARM and DSP) could be used.

The mobile device 140 also includes memory 144. The memory 144 may be any electronic component capable of storing electronic information. The memory 144 may be embodied as random access memory (RAM), read only memory (ROM), magnetic disk storage media, optical storage media, flash memory devices in RAM, on-board memory included with the processor, erasable programmable read only memory (EPROM), electrically erasable PROM (EEPROM), registers, and so forth, including combinations thereof.

Data 146 and instructions 148 may be stored in the memory 144. The instructions 148 may be executable by the processor 142 to implement various functions. Executing the instructions 148 may involve the use of the data 146 that is stored in the memory 144. When the processor 142 executes the instructions 148, it 148 may load certain instructions 148A onto the processor 142. The loaded instructions 148A used for bitstream decoding are illustrated.

Some examples of the data 146 in the memory 144 include, but are not limited to, bitstream data 146A, data from samples of digital audio (e.g., PCM data) 146B, etc. Other types of data 146 that are relevant to implementing the techniques described herein may also be included in the memory 144.

Some examples of the instructions 148 in the memory 144 include: instructions for bitstream decoding; as well as other instructions corresponding to the systems and methods described herein. Other instructions 148 that are relevant to implementing the techniques described herein may also be included in the memory 144.

The mobile device 140 may also include a transmitter 150 and a receiver 152 to allow transmission and reception of data between the mobile device 140 and a remote location. The transmitter 150 and receiver 152 may be combined into a transceiver 154. An antenna 156 may be electrically coupled to the transceiver 154. The mobile device 140 may also include (not shown) multiple transmitters, multiple receivers, multiple transceivers and/or multiple antenna.

The mobile device 140 may also include speakers 157, where a user may listen to audio. The mobile device 140 may also include two or more microphones (158A, 158B, . . . , 158N, etc.).

The various components of the mobile device 140 may be coupled together by a bus system 160 which may include a power bus, a control signal bus, and a status signal bus in addition to a data bus. However, for the sake of clarity, the various buses are illustrated in FIG. 15 as the bus system 162.

In the above description, reference numbers have sometimes been used in connection with various terms. Where a term is used in connection with a reference number, this is meant to refer to a specific element that is shown in one or more of the figures. Where a term is used without a reference number, this is meant to refer generally to the term without limitation to any particular figure. For example, a reference to "mobile device 140" refers to the specific mobile device that is shown in FIG. 15. However, the use of "mobile device" without a reference number refers to any mobile device that is appropriate for the context in which the term is used, and is not limited to any particular mobile devices shown in the figures.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a CPU, a microprocessor, a DSP, a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as RAM, ROM, non-volatile random access memory (NVRAM), programmable read-only memory (PROM), EPROM, EEPROM, flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein can be downloaded and/or otherwise obtained by a mobile device and/or base station as applicable.

For example, such a device can be coupled to a server to facilitate the transfer of means for performing the methods described herein. Alternatively, various methods described herein can be provided via a storage means (e.g., RAM, ROM, a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A method of saving power comprising:
   generating audio samples by batch decoding a plurality of frames of a bitstream with a decoding system;
   transferring the audio samples into at least one memory bank in a set of memory banks in a buffer, the memory banks being configured so that each memory bank can be independently powered on or off;
   switching off power to parts of the decoding system not involved in storing the audio samples in the at least one memory bank, after the batch decoding of the frames is finished and before transferring of the audio samples into the at least one memory bank is finished;
   reading the audio samples from the at least one memory bank; and
   shutting off power to the at least one memory bank after all the audio samples in the at least one memory bank have been read.

2. The method of claim 1, wherein the bitstream comprises bits less than one audio file length.

3. The method of claim 1, wherein the at least one memory bank in the set of memory banks is a power collapsible memory bank.

4. The method of claim 1, further comprising synchronizing at least one paging channel with bitstream fetching.

5. The method of claim 4, wherein the at least one paging channel is slotted.

6. The method of claim 1, further comprising synchronization of at least one paging channel with bitstream decoding.

7. The method of claim 5, wherein the at least one paging channel is slotted.

8. The method of claim 1, further comprising synchronizing the batch decoding with bitstream fetching.

9. The method of claim 8, wherein the synchronizing comprises synchronizing multiple batch decoding events between bitstream fetching.

10. The method of claim 8, further comprising synchronizing at least one paging channel with both batch decoding and bitstream fetching.

11. The method of claim 1, wherein the transferring of audio samples comprises lossless compression.

12. The method of claim 11, wherein the transferring of the audio samples occurs after a re-encoding.

13. The method of claim 1, wherein the bitstream represents a lossy compression.

14. The method of claim 13, wherein the lossy compression comprises at least one of A-law and mu-law samples.

15. The method of claim 1, wherein samples read from the at least one memory bank are played out of at least one speaker.

16. The method of claim 1, wherein samples read from the at least one memory bank are read into a file.

17. The method of claim 1, wherein switching off power comprises placing a mobile device in at least one of a power efficient collapse or a sleep mode.

18. The method of claim 1, wherein switching off power to parts comprises using a foot switch controlled by a power manager.

19. The method of claim 18, wherein the power manager utilizes a voting process.

20. The method of claim 18, wherein the power manager is initiated by a buffer control logic based on a watermark.

21. A device comprising:
   a memory storing at least one bitstream;
   a processor, coupled to the memory, to batch decode a plurality of frames of the at least one bitstream to generate pulse coded modulation (PCM) samples;
   a power saver block including a plurality of memory banks being configured so that each memory bank can be independently powered on or off, the memory banks storing the PCM samples after a transfer of the PCM samples from the processor;
   logic to turn off power to the processor after the processor has completed batch decoding of the frames and before transfer of the PCM samples into the power saver block is complete; and
   logic to turn off power to at least one of the memory banks after all the PCM samples in the at least one memory bank have been read.

22. The device of claim 21, wherein the power saver block further comprises a digital-to-analog converter.

23. The device of claim 21, wherein the transfer of PCM samples is done as PCM samples are generated.

24. The device of claim 21, wherein the transfer of PCM samples comprises grouping PCM samples before a group is sent from the processor to the power saver block.

25. The device of claim 21, wherein the device comprises an integrated circuit.

26. The device of claim 21, wherein the device comprises a mobile device.

27. The device of claim 21, wherein the logic for turning off power to the processor comprises using a foot switch controlled by a power manager.

28. The device of claim 27, wherein the power manager operates by a voting process.

29. The device of claim 27, wherein the power manager is initiated by a buffer control logic based on a watermark.

30. The device of claim 21, wherein the transfer of the PCM samples from the processor occurs after a re-encoding.

31. A mobile device capable of audio playback comprising:
   means for generating pulse coded modulation (PCM) samples by batch decoding a plurality of frames of a bitstream with a decoding system;
   means for transferring the PCM samples into at least one memory bank of a plurality of memory banks included in a power saver block;
   means for independently powering on or off each of the memory banks;
   means for switching off power to parts of the decoding system not involved in storing the PCM samples, after the batch decoding of the frames is finished and before the transfer of the PCM samples into the at least one memory bank is finished; and
   means for shutting off power to the at least one memory bank after all the PCM samples in the at least one memory bank have been accessed.

32. The device of claim 31, wherein accessed samples are played out of at least one speaker.

33. The device of claim 31, wherein accessed samples are read into a file.

34. The device of claim 31, wherein the means for switching off power utilizes a foot switch controlled by a power manager.

35. The device of claim 34, wherein the power manager operates by a voting process.

36. The device of claim 35, wherein the power manager is initiated by a buffer control logic based on a watermark.

37. The device of claim 31, wherein the means for transferring the PCM samples into at least one memory bank in a power saver block occurs after a re-encoding.

38. A non-transitory computer-readable medium configured to store a set of instructions comprising:
   computer-readable program code means for generating pulse coded modulation (PCM) samples by batch decoding a plurality of frames of a bitstream with a decoding system;
   computer-readable program code means for transferring the PCM samples into at least one memory bank of a plurality of memory banks included in a power saver block;
   computer-readable program code means for independently powering on or off each of the memory banks;
   computer-readable program code means for switching off power to parts of the decoding system not involved in storing the PCM samples, after the batch decoding of the frames is finished and before the transfer of PCM samples into the at least one memory bank is finished; and
   computer-readable program code means for shutting off power to the at least one memory bank after all the PCM samples in the at least one memory bank have been accessed.

39. The computer-readable medium claim 38, wherein accessed samples are played out of at least one speaker.

40. The computer-readable medium of claim 39, wherein the computer-readable program code means for transferring the PCM samples comprises code for transferring the PCM samples after a re-encoding.

41. The computer-readable medium of claim 38, wherein accessed samples are read into a file.

42. The computer-readable medium of claim 38, wherein the computer-readable program code means for switching off power comprises code mean for using a foot switch controlled by a power manager.

43. The computer-readable medium of claim 42, wherein the power manager operates by a voting process.

44. The computer-readable medium of claim 42, wherein the power manager is initiated by a buffer control logic based on a watermark.

* * * * *